US012809657B2

(12) United States Patent
Mishra et al.

(10) Patent No.: US 12,809,657 B2
(45) Date of Patent: Nov. 24, 2026

(54) INTER-PROCESSOR COMMUNICATION INTERFACE EMULATION

(71) Applicant: Analog Devices, Inc., Wilmington, MA (US)

(72) Inventors: Tanmaya Mishra, Wilmington, MA (US); Arun Dharankar, Nashua, NH (US)

(73) Assignee: Analog Devices, Inc., Wilmington, MA (US)

( * ) Notice: Subject to any disclaimer, the term of this patent is extended or adjusted under 35 U.S.C. 154(b) by 430 days.

(21) Appl. No.: 18/509,730

(22) Filed: Nov. 15, 2023

(65) Prior Publication Data

US 2025/0156208 A1 May 15, 2025

(51) Int. Cl.

| | |
|---|---|
| ***G06F 9/455*** | (2018.01) |
| ***G06F 9/54*** | (2006.01) |
| ***G06F 13/10*** | (2006.01) |
| ***G06F 15/163*** | (2006.01) |
| ***G06F 15/167*** | (2006.01) |

(52) U.S. Cl.

CPC .......... *G06F 9/45558* (2013.01); *G06F 9/455* (2013.01); *G06F 9/544* (2013.01); *G06F 13/105* (2013.01); *G06F 15/163* (2013.01); *G06F 15/167* (2013.01); *G06F 2009/45562* (2013.01); *G06F 2009/45583* (2013.01)

(58) Field of Classification Search

None

See application file for complete search history.

(56) References Cited

U.S. PATENT DOCUMENTS

| | | | | |
|---|---|---|---|---|
| 8,521,966 | B2 * | 8/2013 | Wibling | G06F 12/109 711/147 |
| 2020/0133704 | A1 * | 4/2020 | Habkost | G06F 9/45508 |

OTHER PUBLICATIONS

Ren et al., "Shared-Memory Optimizations for Inter-Virtual-Machine Communication", Feb. 9, 2016, ACM Computing Surveys (CSUR), vol. 48, Issue 4. (Year: 2016).*

* cited by examiner

*Primary Examiner* — Qing Yuan Wu

(74) *Attorney, Agent, or Firm* — ArentFox Schiff LLP

(57) ABSTRACT

Aspects of the present disclosure relate to an inter-processor communication interface emulation configured to provide a user with a uniform emulation of an interface regardless of the hardware being emulated. In some examples, one or more processors may instantiate, via an emulation software, a first processor based on a first model. In some examples, the one or more processors may emulate a communication interface between the first processor and a second processor, the communication interface configured to model communication channels between the first processor and the second processor.

20 Claims, 7 Drawing Sheets

600

INTER-PROCESSOR COMMUNICATION INTERFACE EMULATION

BACKGROUND

Hardware emulation software provides hardware virtualization and emulation capabilities. It allows a user to run virtual machines on a host system, enabling the user to emulate the behavior of different hardware architectures and run guest operating systems that might be different from the architecture of the host system. Hardware emulation software can be used for various purposes, such as: virtualization (e.g., as a hypervisor to create and manage virtual machines), emulation of various hardware components, such as central processing units (CPUs), network interfaces, storage devices, and graphics adapters), system emulation (e.g., simulating an entire computer system, including its hardware components), and user mode emulation (e.g., running individual user-level applications on the hardware being emulated). Overall, hardware emulation software is a versatile tool that serves a range of purposes related to virtualization, emulation, and cross-platform development.

There exists a need for further improvements in virtualization, emulation, and cross-platform development. Such improvements may also be applicable to other technologies and standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Aspects are directed to an apparatus configured for inter-processor interface emulation. In some examples, the apparatus includes one or more memories, individually or in combination, having instructions. In some examples, the apparatus includes one or more processors, individually or in combination, configured to execute the instructions. In some examples, the one or more processors are configured to instantiate, via an emulation software, a first processor based on a first model. In some examples, the one or more processors are configured to emulate a communication interface between the first processor and a second processor, the communication interface configured to model communication channels between the first processor and the second processor.

Aspects are directed to a method for inter-processor interface emulation. In some examples, the method includes instantiating, via an emulation software, a first processor based on a first model. In some examples, the method includes emulating a communication interface between the first processor and a second processor, the communication interface configured to model communication channels between the first processor and the second processor.

Aspects are directed to a non-transitory, computer-readable medium comprising computer executable code. In some examples, the code when executed by one or more processors causes the one or more processors to, individually or in combination to instantiate, via an emulation software, a first processor based on a first model. In some examples, the code when executed by one or more processors causes the one or more processors to, individually or in combination to emulate a communication interface between the first processor and a second processor, the communication interface configured to model communication channels between the first processor and the second processor.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
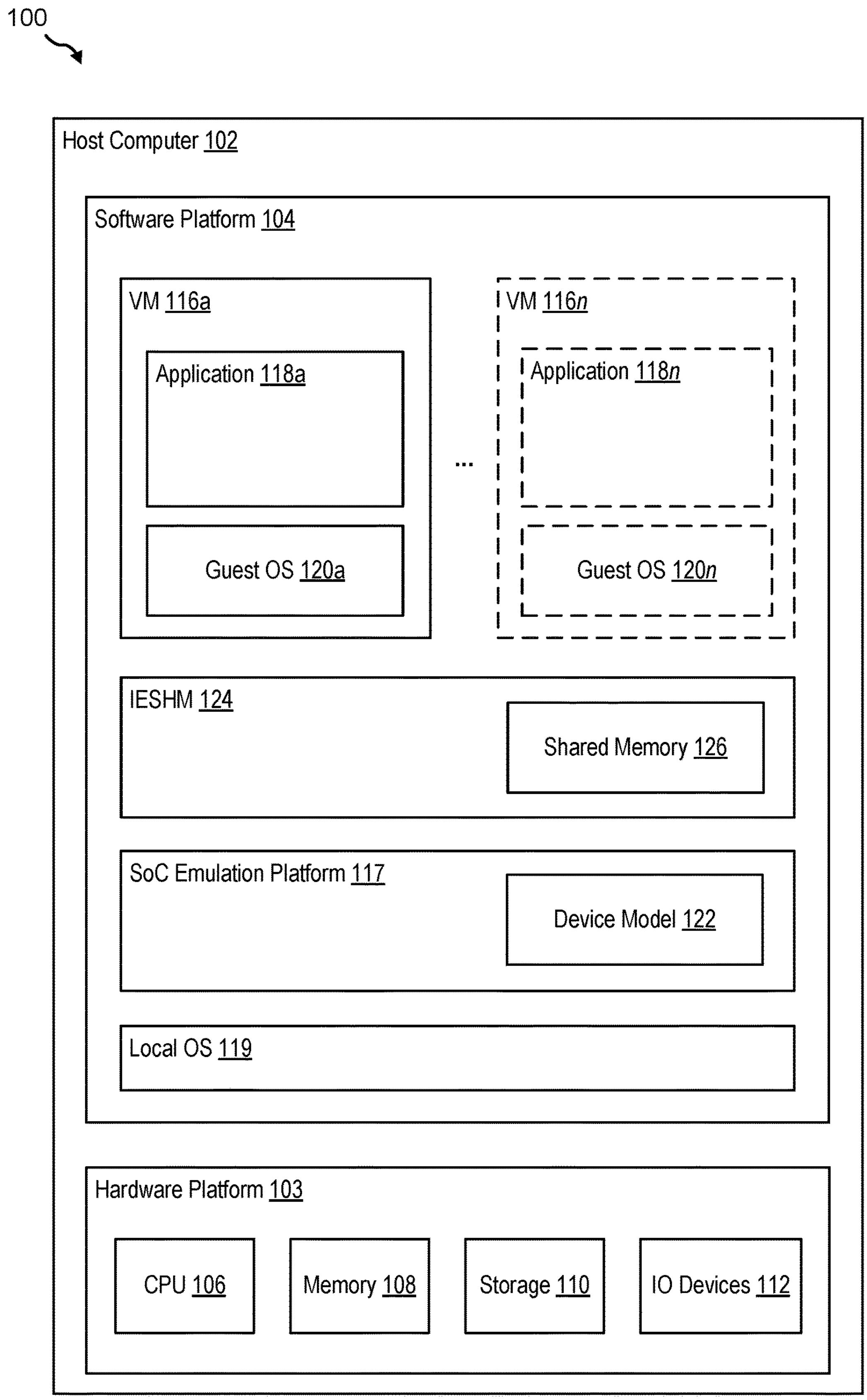
FIG. 1 is a block diagram illustrating a computing system, according to aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Processor and/or system-on-a-chip (SoC) emulation platforms (collectively referred to hereinafter as SoC emulation platforms) are virtualization tools configured to provide a user with a mechanism for simulating hardware platforms, such as central processing units (CPUs), one or more processors, memory, storage devices, and other peripherals (connectivity, analog, and digital peripherals such as inter-integrated circuit (I2C) and the like), on a host machine. For example, SoC emulation platforms may be used to create and manage virtual machines (VMs) with different hardware configurations to emulate SoCs (e.g., multi-processor devices and associated peripherals) and/or standalone processors for cross-platform development and system testing. Such SoC emulation platforms may include, but are not limited to, Quick Emulator (QEMU) and any other suitable hardware emulators.

Peripheral Component Interconnect (PCI) and PCI express (PCIe) are standard bus interfaces that allow peripheral devices like network adapters, graphics cards, storage controllers, and more to connect to a CPU. PCI/PCIe provide a standardized way for these devices to communicate with the CPU and share resources (e.g., digital storage resources and processing resources).

SoC emulation platforms may emulate or virtualize PCI/PCIe devices within a virtual machine environment. For example, SoC emulation platforms may emulate various PCI devices (e.g., network cards, graphics adapters, storage controllers, and other peripherals) in a manner that allows guest operating systems running inside the virtual machines to interact with these emulated PCI devices as if they were physical devices. SoC emulation platforms may also support PCI passthrough. In this example, a user may assign/couple a physical PCI device from the host machine directly to a virtual machine. Here, the user may need to provide a virtual machine with direct access to a specific piece of hardware.

Accordingly, PCI plays a significant role in providing a functional virtual environment for emulating or passing through PCI devices. SoC emulation platforms enable virtual machines to interact with a wide range of hardware peripherals just like they would on physical machines. This is essential for various use cases, from software testing and development to running legacy systems or even gaming within virtual machines (VMs).

Moreover, SoC emulation platforms may be configured to support inter-VM shared memory (IVSHMEM) in a multiple VM emulation environment. More specifically, IVSHMEM is a mechanism in virtualization environments that allows multiple VMs running on the same host to directly share a same region of memory with each other. This shared memory region facilitates low-latency communication and data exchange between VMs. However, IVSHMEM relies on the availability of PCI/PCIe interfaces, which makes IVSHMEM unsuitable for utilization with microcontroller and other similar processing environments.

Thus, according to certain aspects, the present disclosure is directed to techniques for emulating an interface between processors (e.g., an application processing unit (APU)) and/or microcontrollers for inter-processor or inter-microcontroller communication. For example, the emulated interface may include one or more end-to-end buffers (e.g., gaskets) between a host processor and an emulated microcontroller, system-on-a-chip (SoC), or other processing device. In some examples, the interface is a "unified interface," meaning that the interface is the same from the perspective of a user (e.g., a firmware engineer) despite the user emulating different processor architectures.

In certain aspects, a co-processor that is separate from a main application processor may be used to perform processing of security-related data processing/storage. This reduces or eliminates the storing and processing of security aspects by the main application processor, leaving it free to continue processing application software. Thus, the unified interface of the present disclosure may provide the user with an ability to create an emulation of the security co-processor prior to completing a physical implementation of the co-processor. Accordingly, through emulation testing and without the need for co-processor hardware, firmware and software of the security co-processor may be quickly prototyped and designed for hardware implementation within new system designs.

Moreover, a unified emulation interface (e.g., the same interface applicable to multiple different processor architectures) may provide a user with an ability to test and create firmware and application software independent of hardware availability and testing. In other words, a user may apply the same interface to multiple different processor architectures prior to the processor architecture even existing. Providing an interface emulation, while the underlying implementation is being developed by the hardware teams, allows firmware engineers to continuously iterate drivers and/or upstream drivers to open-source projects such as Linux well before the hardware is produced and/or released to market.

Reference will now be made in detail to several aspects of the disclosure, examples of which are illustrated in the accompanying figures. It is noted that wherever practicable, similar or like reference numbers may be used in the figures and may indicate similar or like functionality. The figures depict aspects for purposes of illustration only. One skilled in the art will readily recognize from the following description that alternative implementations of the structures and methods illustrated herein may be employed without departing from the principles described herein.

FIG. 1 is a block diagram illustrating a computing system 100 with which one or more aspects of the present disclosure may be utilized. As illustrated, computing system 100 includes at least one host computer 102 (also referred to herein as "host"). Although a single host is depicted in FIG. 1, it is recognized that computing system 100 may include a plurality of host computers 102, which can be arranged in an interconnected test bench, server system such as a data center, or the like. As illustrated, a dashed line indicates an optional aspect. For example, an nth virtual machine (VM) **116*n* may be included for a scenario where more than one VMs operate on the host computer 102**.

Host 102 includes a software platform 104 executing on a hardware platform 103. Hardware platform 103 may include conventional components of a computing device, such as a central processing unit (CPU) 106 and system memory ("memory 108"), as well as a storage system ("storage 110"), input/output (IO) devices 112, and the like. CPU 106 is configured to execute instructions, for example, executable instructions that perform one or more operations described herein and may be stored in memory 108 and/or storage 110. Memory 108 is a device allowing information, such as executable instructions, virtual disks, configurations, and other data, to be stored and retrieved. Memory 108 may include, for example, one or more random access memory (RAM) modules. Storage 110 includes local storage devices (e.g., one or more hard disks, flash memory modules, solid state disks, and optical disks). IO devices 112 include interfaces, such as but not limited to one or more peripheral devices (e.g., an internal or external device that connects directly to the host 102 or other digital device but does not contribute to the host's primary computing functions) and/or network devices. In certain aspects, software platform 104 includes a local operating system (OS) 119 that executes directly on hardware platform 103. The local OS 119 can be any operating system that functions as described below with respect to FIG. 3, such as but not limited to Microsoft Windows®, Linux®, or like type operating systems.

In some examples, an SoC emulation platform 117 may operate on top of the local OS 119. SoC emulation platform 117 is a virtualization layer that abstracts processor, memory, storage, and networking resources of hardware platform 103 to generate one or more virtual machines (VMs) 116 that may run concurrently on the host 102. SoC emulation platform 117 may enable sharing of the hardware resources among multiple VMs 116. Although FIG. 1 illustrates a first VM 116*a* and an nth VM 116*n* running on top of the SoC emulation platform 117, any suitable number of VMs 116 may operate including one. In some examples, a guest OS 120 may be executed by one or more of the VMs 116 (e.g., a first guest OS 120*a* executed on the first VM 116*a*, and an nth operating system 120*n* executed on the nth VM 116*n*). Virtualization technology allows a computer to run more than a single OS at the same time. That is, in some examples, a guest OS may be installed on either a VM or a partitioned disk used by the VM, and that guest OS is separate from the local OS that executes on the hardware platform. Accordingly, both the guest OS and local OS may run on the same computer system in parallel. Each VM 116 may execute one or more applications 118 (e.g., first application 118*a* and nth application 118*n*) on each VM 116. As illustrated, the one or more applications 118 may be executed on top of a corresponding guest OS 120. However, it should be noted that in some examples, an application may be executed "bare metal," in which case the corresponding guest OS may not be necessary.

SoC emulation platform 117 may generate VMs that emulate computer hardware, such a processors, microcontrollers, systems-on-a-chip (SoC), etc. In other words, SoC emulation platform 117 may simulate various hardware components, including CPUs, to create VMs in which guest OSs and software can run. These VMs may be created by SoC emulation platform 117 to provide isolated environments for testing, development, cross-platform compatibility, etc. For example, a user may utilize SoC emulation platform 117 to create a device model 122 (e.g., a model microcontroller) and one or more VMs 116 to operate on the emulated hardware component(s) of the model IO device 112.

Accordingly, SoC emulation platform 117 may be used to generate and emulate model SoCs, microcontrollers, and processors (CPUs) of different architectures, such as x86, ARM, PowerPC, MIPS, etc. SoC emulation platform 117 may also be used to create VMs that utilize the model processors. These VMs may be executed in isolated environments that run within the SoC emulation platform 117 process on the host computer 102. Within one or more of the VMs, a user may install and run guest OSs 120 and applications 118 that interact with the emulated model processor as if it were real hardware.

In certain aspects, the first VM 116*a* may be configured to emulate a first processor, and the nth VM 116*n* may be configured to emulate a second processor. Each of the first processor and the second processor may be based on the same or different device model 122.

In certain aspects, an inter-emulation shared memory (IESHM) 124 device may be executed within the software platform 104. IESHM 124 may be used by SoC emulation platform 117 to facilitate communication and data sharing between VMs 116 that are running on the same or different hosts. Thus, while the SoC emulation platform 117 may create multiple VMs that typically operate as independent instances of hardware, operating systems, applications, and resources, IESHM 124 may provide these VMs 116 with a means for communicating and sharing data via a shared memory region 126.

In one example, IESHM 124 may enable VMs 116 to use the shared memory region 126 as a common communication channel. Thus, the VMs 116 may read from and write to the shared memory region 126 to exchange data with each other with a relatively lower latency relative to network-based communications. The shared memory region 126 may be isolated from the memory used by of each of the individual VMs 116 and may be managed by SoC emulation platform 117. In some examples, the shared memory region 126 may be a virtual memory region that is mapped to resources located in the memory 108 and/or the storage 110 of the hardware platform 103 of the host 102.

Figure 2:
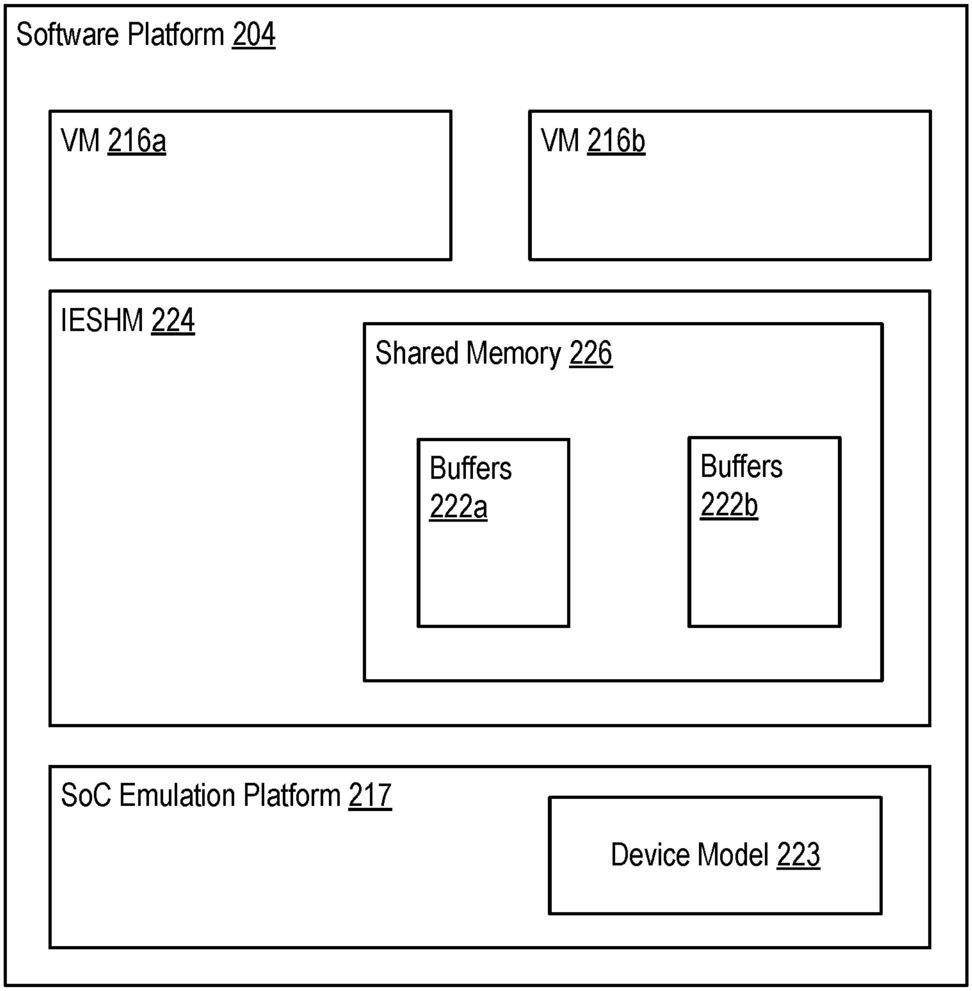
FIG. 2 is a block diagram illustrating an example software platform according to aspects of the present disclosure.

FIG. 2 is a block diagram illustrating a software platform 204 (e.g., similar to software platform 104 of FIG. 1) with which one or more aspects of the present disclosure may be utilized. Here, the software platform 204 includes an instantiation of two VMs 216 (e.g., a first VM 216*a* and a second VM 216*b*). Each VM 216 is an emulation of a model processor or microcontroller based on a device model 223. Each VM 216 may be a different type of processor or microcontroller relative to the other VM. For example, a user may emulate a microcontroller via the first VM 216*a*, and emulate another microcontroller via the second VM 216*b*. Here, the user may use an inter-emulation shared memory (IESHM) 224 to emulate an interface that provides dedicated communication channels between the emulated microcontrollers.

In some examples, the emulated interface may include end-to-end buffers (e.g., gaskets) emulated for each microcontroller. For example, the IESHM 224 may emulate an interface between a first end-to-end buffer 222*a* of the first VM 216*a* and a second end-to-end buffer 222*b* of the second VM 216*b* in a shared memory 226 space such that the buffers 222 of both VMs 216 are exposed to the user in a unified manner (e.g., each emulated microcontroller would be exposed to the emulated interface in the same manner) despite each VM 216 emulating a different microcontroller.

In some examples, the emulated interface would include a range of contiguous memory mapped to each microcontroller's address space. Thus, when either of the emulated microcontrollers read or write to it, the data automatically gets shifted into the buffer. In some examples, the emulated interface may include a register interface where each microcontroller may write to the register which records the written data in the buffer. Here, if one of the emulated microcontrollers reads from the register, that microcontroller gets a read from the buffer to which the other microcontroller has written.

In some examples, the buffers 222 may form an integrated aspect of an SoC architecture that includes the emulated microcontroller and processor. For example, the emulated processor may form a part of an SoC, and the emulated microcontroller may be one of one or more co-processors that also form a part of the SoC. Here, the processor emulated by the second VM 216*b* may be a main processor of an SoC, and the microcontroller emulated by the first VM 216*a* may be configured to perform security-related data processing and storage. Such a configuration may free up processing resources of the main processor by offloading other processes, such as but not limited to security processes, to the microcontroller.

Figure 3:
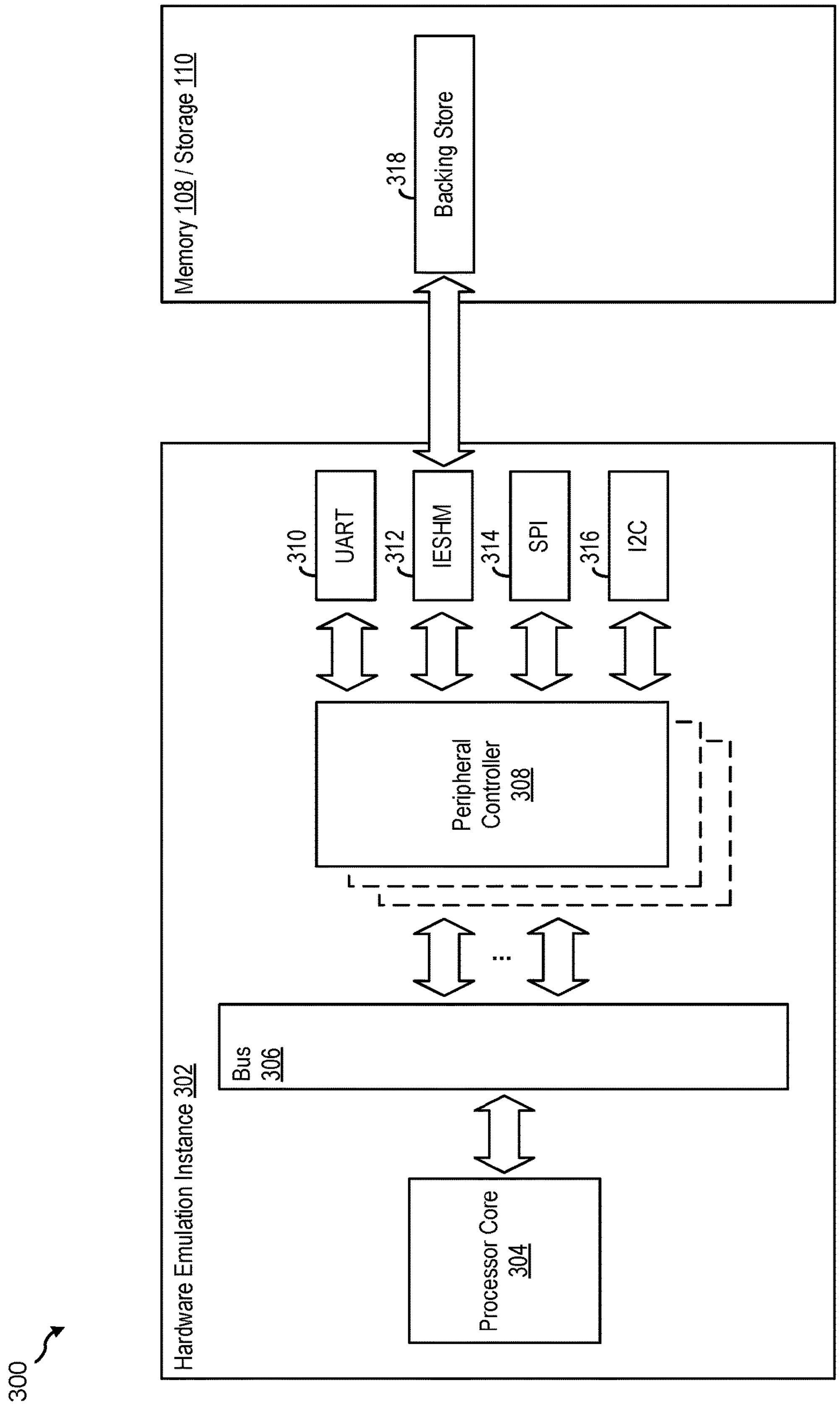
FIG. 3 is a block diagram illustrating an example hardware emulation according to aspects of the present disclosure.

FIG. 3 is a block diagram conceptually illustrating an example system 300 including a hardware emulation instance 302 of at least a portion of a microcontroller (e.g., an advanced reduced instruction set computer (RISC) architecture, complex instruction set computer (CISC) architecture, ARM microcontroller (AMU) architecture, etc.), and a backing store 318 stored on a host (e.g., host 102 of FIG. 1) memory and/or storage. The hardware emulated instance 302 may include features typically found in an microcontroller, including a processor core 304, a bus 306, one or more peripheral controller(s) 308, and various peripherals (e.g., a universal asynchronous receiver/transmitter (UART) 310, IESHM 312, a serial peripheral interface (SPI) 314, and an inter-integrated circuit (I2C) 316). It should be noted that the peripheral controller(s) 308 may not exist in the system 300 if the system 300 is a microcontroller but may exist if the system 300 is an APU. The emulated instance 302 may be generated by an SoC emulation platform (e.g., SoC emulation platform 117 of FIG. 1 and SoC emulation platform 217 of FIG. 2) in a virtual environment (e.g., VM 116 of FIG. 1 and VM 216 of FIG. 2) based on a device model.

In certain aspects, the IESHM 312 may be implemented as a "shim" or piece of software that serves as an intermediary or adapter between the emulation instance 302 and another emulation instance or the host. Here, the SoC emulation platform may utilize the IESHM 312 shim to abstract the differences between the emulated MPS2 302 and the hardware of the host system to bridge compatibility gaps, facilitate communication, and/or translate between different protocols or application programming interfaces (APIs). As illustrated, the IESHM 312 may use backing store 318 to facilitate such processes.

In some examples, the IESHM 312 may emulate an inter-processor communication interface and may be implemented by adding a separate software device that plugs into existing SoC emulators. In certain aspects, the IESHM 312 may use a dedicated portion of the physical memory of the host by being directly attached to a system bus. For example, microcontrollers may be capable of accessing peripheral devices without using a memory translator such as a memory management unit (MMU). Thus, the IESHM 312 may be plugged into a bus allowing the microcontroller to communicate directly to the IESHM 312 without requiring a memory translator. Accordingly, the IESHM 312 may work with any processing environment and not just one that supports a specific communication protocol such as SPI, I2C, etc.

For example, backing store 318 may use RAM memory of the host to emulate a shared buffer for intercommunication between different hardware emulation instances operating on different VMs (e.g., first VM 116*a* and nth VM 116*n*). Backing store may be implemented as a file in the host file system. Both VMs may be run as a microcontroller executing code, and each emulated microcontroller may write to a memory resource that is mapped to an address space of the other microcontroller. However, when the VMs write to a particular memory region of the other microcontroller, IESHM may translate the memory region address space to the host file system and write to the backing store 318 as if it is writing to a file stored on the other microcontroller. IESHM may provide both VMs with mapping to the backing store 318 so that both VMs can transparently read/write from/to a particular file and IESHM can translate what's being written or read from each of their individual applications.

Figure 4:
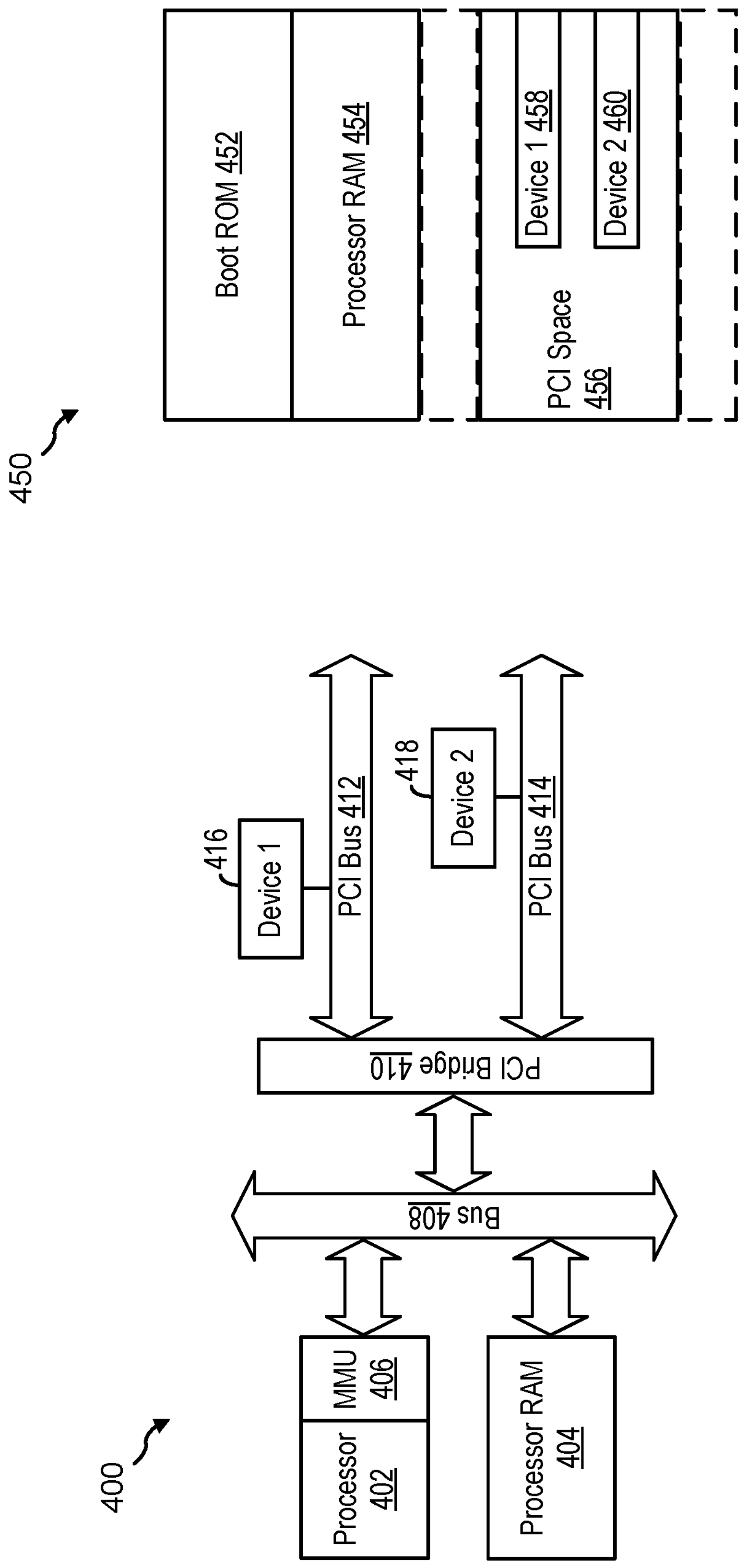
FIG. 4 is a block diagram illustrating an example processing system configured with a peripheral component interconnect (PCI), and a corresponding address space for mapping various devices within the PCI interface.

FIG. 4 is a block diagram illustrating an example processing system 400 (e.g., an application processing unit (APU)) configured with a PCI, and a corresponding address space 450 for mapping various devices within the PCI interface. The processing system 400 includes a processor 402, a processor RAM 404, and an MMU 406 coupled to a bus 408. The bus 408 is coupled to a PCI bridge 410 that includes multiple PCI buses (e.g., a first PCI bus 412 and a second PCI bus 414). A first device 416 is coupled to the first PCI bus 412, and a second device 418 is coupled to the second PCI bus 414. The devices may include any suitable device that may be coupled to a PCI bus, such as a network card, a graphics card, a modem, etc.

The MMU 406 may be configured to map the devices coupled to the PCI buses to the address space 450. For example, upon boot of the processing system 400, the processing system 400 may query the PCI buses to determine whether any devices are present and to determine address space information of the present devices. If the processing system 400 determines that the first device 416 and the second device 418 are present, the MMU 406 may map those devices to addresses in the address space 450.

The address space 450 may include a memory address for a boot ROM 452, a memory address for a processor RAM 454, and a PCI space 456 within which the MMU 406 may allocate first address space 458 for the first device 416 and second address space 460 for the second device 418.

Figure 5:
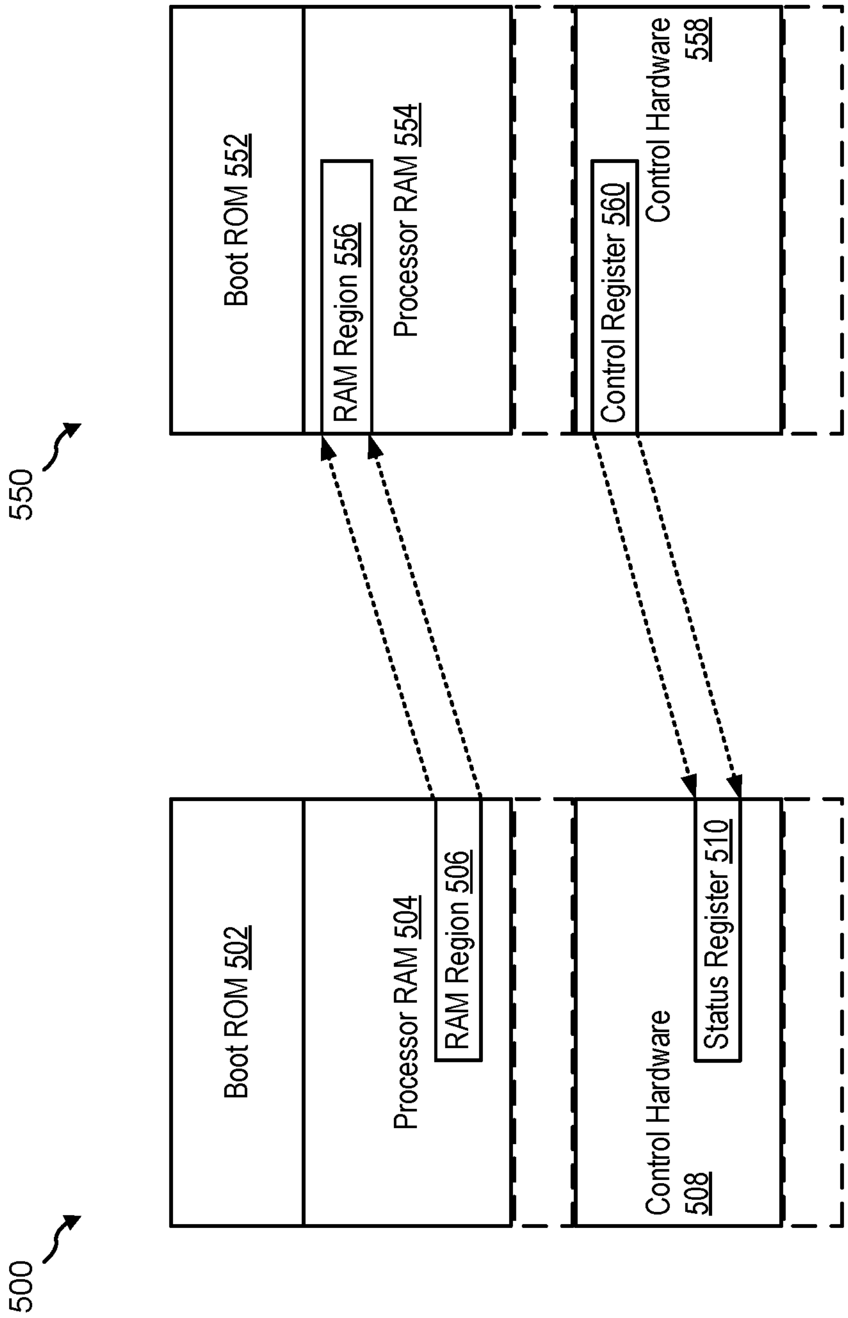
FIG. 5 is a block diagram illustrating a first memory space corresponding to a first microcontroller and a second memory space corresponding to a second microcontroller.

FIG. 5 is a block diagram illustrating a first memory space 500 corresponding to a first microcontroller, and a second memory space 550 corresponding to a second microcontroller. Each memory space includes a respective boot ROM 502/552, processor RAM 504/554, and control hardware 508/558. In this example, instead of using a PCI/PCIe, each microcontroller may have a memory region mapped to a memory region of the other microcontroller via hard wiring. That is, instead of a software mapping like that used by the MMU 406 of FIG. 4, the memory regions and registers are hard-wired.

A first memory region 506 of a first microcontroller is hard-wired to a second memory region 556 of the second microcontroller. Thus, data written to the first memory region 506 is also written to the second memory region 556. Similarly, a control register 560 of the second microcontroller may be hard-wired to a status register 510 of the first microcontroller. Accordingly, data written to the control register 560 is visible to the second microcontroller via the status register 510. Thus, there is no need for an MMU to perform any sort of memory address mapping between the first microcontroller and the second microcontroller because such software mapping cannot change a hard-wired memory interface.

However, when the first microcontroller and the second microcontroller are emulated via an SoC emulator, the hard-wired interface between first microcontroller and the second microcontroller is also emulated. Here, the IESHM (e.g., IESHM 312 of FIG. 3) may emulate the hard-wired interface between respective memory regions of the first and second microcontrollers by generating a document in the file system (e.g., backing store 630 of FIG. 6) of the host hardware platform (e.g., host hardware platform 603 of FIG. 6). The IESHM may map the document to both the first memory region 506 and the second memory region 556 so that the document is accessible to both the first microcontroller and the second microcontroller. Thus, if the emulated first microcontroller writes data to an address space of the first memory region 506, the IESHM may take the written data and write it to the document, thereby providing the second microcontroller with access to the written data.

Similarly, the IESHM may take data intended to be written to the control register of the second microcontroller and write the data to a document mapped to both the control register 560 and the status register 510 instead. Accordingly, the first microcontroller may have access to the written data via a status register 510 that the IESHM has mapped to the file.

It should be noted that although FIG. 5 illustrates the RAM region mapping direction as opposite to the status register and control register mapping direction, the mapping directions are examples. Any suitable direction of mapping between the first memory space 500 and the second memory space 500 are may be used. For example, each of the first memory space 500 and the second memory space 500 may include a control register corresponding to a status register of the other memory space, and a status register corresponding to a control register of the other memory space.

Figure 6:
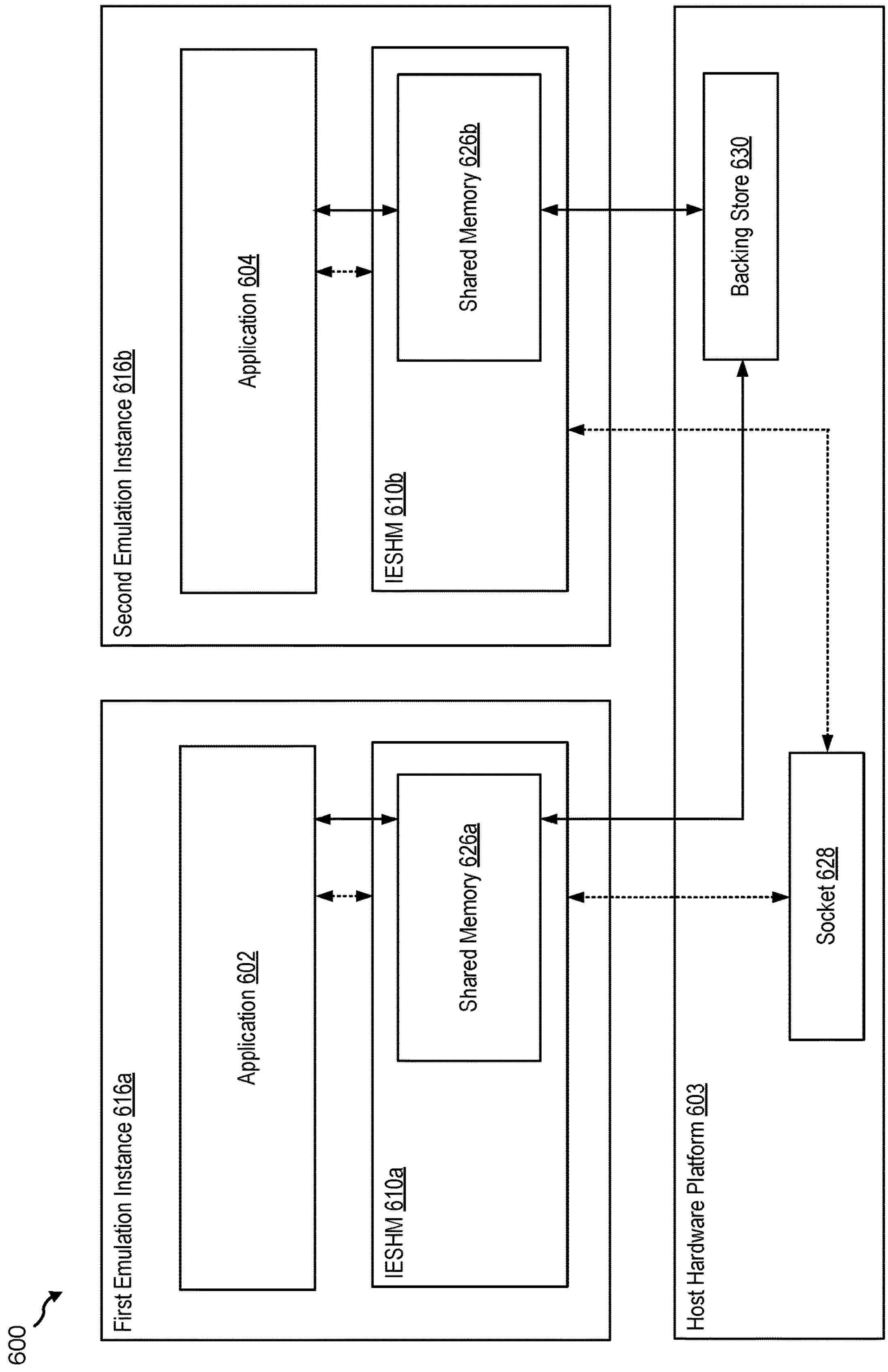
FIG. 6 is a block diagram illustrating an example of an emulated interface configured for inter-processor communication.

FIG. 6 is a block diagram illustrating an example system-level architecture 600 of two emulated microcontrollers (e.g., first emulation 616*a* and second emulation 616*b*). Each emulation instance may be emulated within a VM (e.g., first emulation 616*a* may be executed within the first VM 116*a* of FIG. 1, and the second emulation 616*b* may be executed within the nth VM 116*n* of FIG. 1).

The first emulation 616*a* may include a first IESHM 610*a* configured to emulate hardware based on a device model (e.g., device model 122 of FIG. 1 and device model 222 of FIG. 2). For example, the IESHM 610*a* may be an emulation of an ARM Cortex microcontroller or any other suitable microcontroller or processor. A first application 602 of one or more software applications may be executed on top of the hardware emulated by the first IESHM 610*a*. For example, the first application 602 may be a server application configured to operate on top of the emulated hardware of the first IESHM 610*a* as a server. The first IESHM 610*a* may provide a first shared memory 626*a* resource configured to allow the first IESHM 610*a* to transparently write and read as if the first application 602 is writing or reading a memory region in its own address space. For example, the first IESHM 610*a* may generate a document and map that document to a memory region (e.g., backing store 630) common to both the first emulation instance 616*a* and the second emulation instance 616*b* so that the document is accessible to applications executed within each of the first emulation instance 616*a* and the second emulation instance 616*b*. In this way, a hard-wired interface (e.g., the hard-wired interface between RAM regions and/or registers, as illustrated in FIG. 5) between memory regions and/or registers of different microcontrollers may be emulated.

The second emulation 616*b* may be executed in another VM separate from a VM that executed the first emulation 616*a*. The second emulation 616*b* may include a second IESHM 610*b* configured to emulate hardware based on a device model that is the same or different from the device model used by the first emulation 616*a*. A second application 604 of one or more software applications may be executed on top of the hardware emulated by the second IESHM 610*b*. For example, the second application 604 may be a client application configured to operate on top of the emulated hardware of the second IESHM 610*b* as a client that communicates (e.g., both transmits data and receives data) with the first application 602 of the first emulation 616*a*. It should be noted that the applications of server and client are examples, and any suitable applications that use inter-processor communications may be used. The second IESHM 610*b* may provide a second shared memory 626*b* resource configured to allow the second IESHM 610*b* to transparently write and read as if the second application 604 is writing or reading a memory region in its own address space.

For example, the first application 602 of the first emulation instance 616*a* may execute a write command in a local memory space (e.g., first shared memory 626*a*) that is designed to be hard-wired to another local memory space (e.g., second shared memory 626*b*) of the second emulation instance 616*b*. The designed hard-wiring may be reflected in the device model(s) used for the first emulation 616*a* and the second emulation 616*b*. Here, the first IESHM 610*a* may map the first shared memory 626*a* to a memory resource of the backing store 630 and write the data to that memory resource. That memory resource of the backing store 630 is also mapped to the second shared memory 626*b*, thereby providing the written data to the second emulation instance 616*b*. Thus, for example, when the first application 602 of the first emulation instance 616*a* writes to a local memory of the first emulation instance 616*a*, the values written are visible to the second application 604 of the second emulation instance 616*b* if the values are written to the shared memory 626*a*.

Similarly, each instance of IESHM may be configured to emulate a hard-wired interface between control registers of and status registers of emulated microprocessors. For example, when the first application 602 of the first emulation instance 616*a* writes control bytes to a control register, the first IESHM 610*a* may write the control bytes to the backing store 630 and trigger an interrupt handler received by the second IESHM 610*b* instance via the socket 628. The interrupt may notify the second IESHM 610*b* that the written bytes are visible as status register bits in the backing store 630. As such, each instance of the IESHM may be configured with its own set of status and control registers, as well as dedicated interrupt line(s) for communicating to the emulated processor cores if there is data available from another emulated processor. As illustrated, solid arrow lines represent shared memory paths, and dashed arrow lines represent register paths.

In one example of operation, the first application 602 of the first emulation 616*a* may generate and issue a command to write data to memory. The first IESHM 610*a* may pass the command and data to the backing store 630 via the first shared memory 626*a*. The first application 602 may also write a "1" to a register indicating to transmit an interrupt. The IESHM 610*a* may translate the set register value to a command and send it to the socket 628. The command may be forwarded to the second application 604 of the second emulation 616*b* due to it also being connected to the socket 628. Here, because the first emulation instance 616*a* and the second emulation instance 616*b* are designed to be hard-wired, the IESHM 610*a* of the first emulation instance may write the command to the backing store 630 (e.g., translate the shared memory 626*a* space of the first emulation instance 616*a* to which the command would be written to a resource of the backing store 630). The IESHM 610*a* of the first emulation instance 616*a* may trigger an interrupt via the socket 628 and the IESHM 610*b* of the second emulation instance 616*b* may receive the interrupt and trigger the interrupt at the corresponding second application 604 and update its status register by reading the command at the backing store 630. The second application 604 may handle the interrupt which triggers the second application 604 to read the backing store 630 via the shared memory 626*b*.

It should be noted that interrupt emulation may be performed using any suitable alternative to sockets. For example, interrupt emulation may also, or alternatively be performed by an interprocess communication (IPC) API (e.g., file pipe/FIFO) provided by the local OS (e.g., local OS 119 of FIG. 1) or the guest OS (e.g., guest OS 120 of FIG. 1).

In some examples, each emulation may be of a processing core (Cortex-A, Cortex-M, RISCV, etc.) different from other emulations. For example, each emulation may include its own OS, firmware, application software, etc., for example, as illustrated in the VMs 116 of FIG. 1. In some examples, an emulator may or may not execute on the same host machine. Thus, the first emulation instance 616*a* may be an emulation of a different processor or microprocessor than the second emulation instance 616*b*.

In certain aspects, each IESHM instance may map shared memory provided by the host. This memory can be shared across different emulations. This provides the means to achieve complex memory access techniques such as direct memory access (DMA). In certain aspects, each hardware emulation may be performed on a different VM on the same host. However, in some examples, one or more hardware emulations may also be executed on a different host. Each instance of a hardware emulation may be referred to as a "peer." Accordingly, each emulated microcontroller may communicated with another of multiple emulations without a master/subordinate, primary/secondary, or principal/agent relationship.

Figure 7:
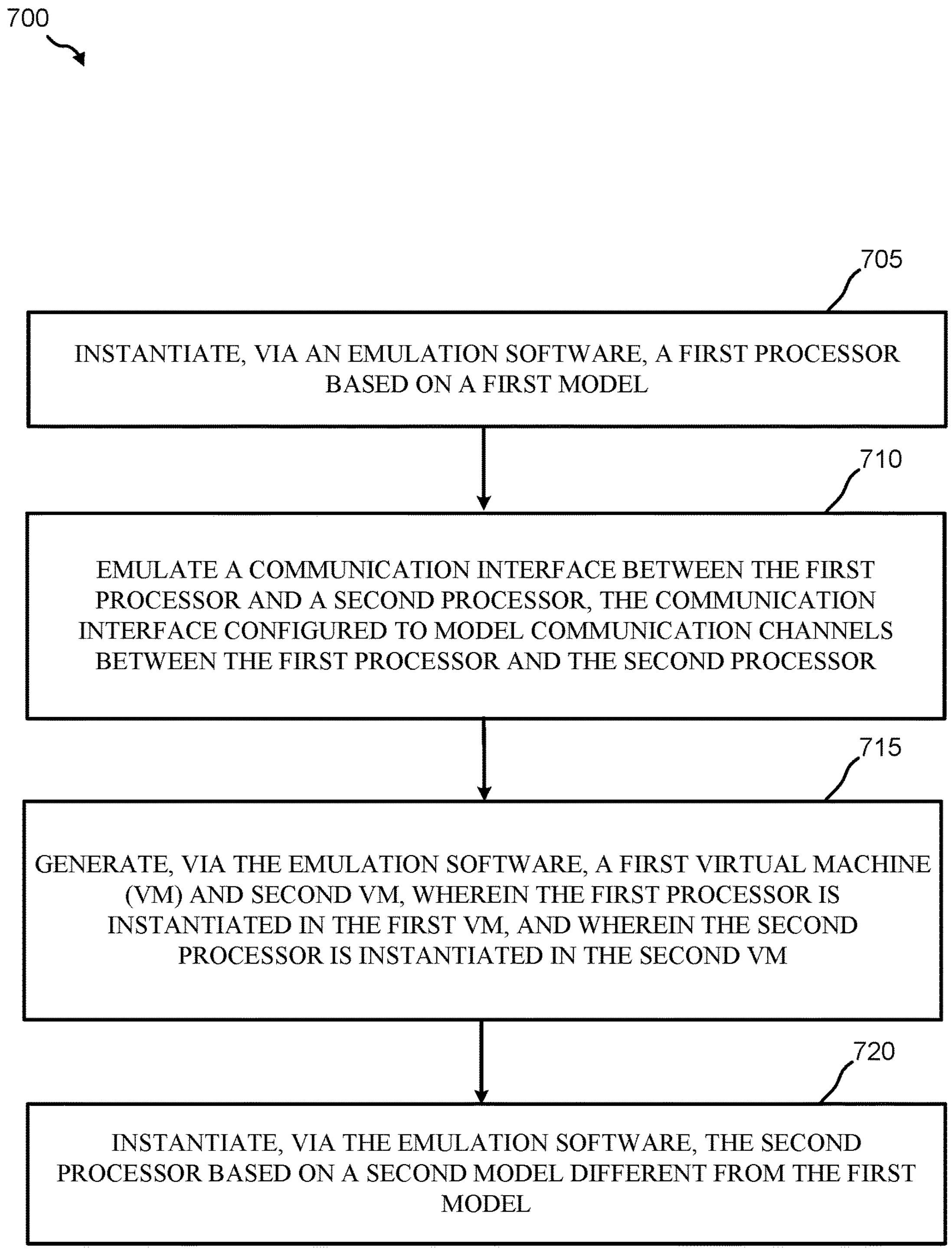
FIG. 7 is a flow diagram illustrating an example method for emulating an inter-processor communication interface, according to aspects of the present disclosure.

Turning to FIG. 7, a method 700 of providing an inter-processor communication interface emulation.

At block 705, the method 700 may instantiate, via an emulation software, a first processor based on a first model.

At block 710, the method 700 may emulate a communication interface between the first processor and a second processor, the communication interface configured to model communication channels between the first processor and the second processor.

At block 715, the method 700 may generate, via the emulation software, a first virtual machine (VM) and second VM, wherein the first processor is instantiated in the first VM, and wherein the second processor is instantiated in the second VM.

At block 720, the method 700 may instantiate, via the emulation software, the second processor based on a second model different from the first model.

In certain aspects, the emulation software comprises a quick emulator (QEMU).

In certain aspects, the second processor is a different type of processor relative to the first processor.

In certain aspects, the communication interface is agnostic to the type of processor associated with the first processor and the second processor.

In certain aspects, the communication interface is configured to model communication channels at end-to-end buffers integrated into each of the first processor and the second processor.

In certain aspects, each of the first model and the second model comprises one of a microcontroller model or a system-on-a-chip model.

In certain aspects, at least a portion of memory resources of the one or more memories is shared between the first processor and the second processor.

In certain aspects, the communication interface is a hard-wired interface between a first memory region of the first processor and a second memory region of the second processor.

In certain aspects, the first memory region is a random-access memory (RAM) region of the first processor, and wherein the second memory region is a RAM region of the second processor.

In certain aspects, the first memory region is a control register of the first processor, and wherein the second memory region is a status register of the second processor.

Example Aspects

Example 1 is a method for inter-processor interface emulation, comprising: instantiating, via an emulation software, a first processor based on a first model; and emulating a communication interface between the first processor and a second processor, the communication interface configured to model communication channels between the first processor and the second processor.

Example 2 is the method of example 1, further comprising: generating, via the emulation software, a first virtual machine (VM) and second VM, wherein the first processor is instantiated in the first VM, and wherein the second processor is instantiated in the second VM.

Example 3 is the method of any of examples 1 and 2, wherein the emulation software comprises a quick emulator (QEMU).

Example 4 is the method of any of examples 1-3, further comprising: sharing at least a portion of memory resources between the first processor and the second processor.

Example 5 is the method of example 4, wherein the portion of memory resources is shared via an inter-emulation shared memory (IESHM) device model.

Example 6 is the method of any of examples 1-5, further comprising: instantiating, via the emulation software, the second processor based on a second model different from the first model.

Example 7 is the method of example 6, wherein each of the first model and the second model comprises one of a microprocessor model or a system-on-a-chip model.

Example 8 is the method of any of examples 1-7, wherein the second processor is a different architecture of processor relative to the first processor.

Example 9 is the method of example 8, wherein the communication interface is agnostic to a type of processor associated with the first processor and the second processor.

Example 10 is the method of any of examples 1-9, wherein the communication interface is configured to model communication channels at end-to-end buffers integrated into each of the first processor and the second processor.

Example 11 is the method of any of examples 1-10, wherein the communication interface is a hard-wired interface between a first memory region of the first processor and a second memory region of the second processor.

Example 12 is the method of example 11, wherein the first memory region is a random-access memory (RAM) region of the first processor, and wherein the second memory region is a RAM region of the second processor.

Example 13 is the method of example 11, wherein the first memory region is a control register of the first processor, and wherein the second memory region is a status register of the second processor.

Example 14 is an apparatus configured for inter-processor interface emulation, comprising: one or more memories, individually or in combination, having instructions; and one or more processors, individually or in combination, configured to execute the instructions and cause the apparatus to perform the method of any of examples 1-13.

Example 15 is an apparatus configured for inter-processor interface emulation, comprising: one or more means for performing the method of any of examples 1-13.

Example 16 is a non-transitory, computer-readable medium comprising computer executable code, the code when executed by one or more processors causes the one or more processors to, individually or in combination, perform the method of any of examples 1-13.

Additional Considerations

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. For example, changes may be made in the function and arrangement of elements discussed without departing from the scope of the disclosure. Also, various examples may omit, substitute, or add various procedures or components as appropriate. For instance, the methods described may be performed in an order different from that described, and various steps may be added, omitted, or combined. Also, features described with respect to some examples may be combined in other examples. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. An apparatus configured for inter-processor interface emulation, comprising:
- one or more memories, individually or in combination, having instructions; and
- one or more processors, individually or in combination, configured to execute the instructions and cause the apparatus to:
  - generate a first virtual machine (VM);
  - emulate, via the first VM, a first processor based on a first model;
  - emulate a communication interface between the first processor and a second processor, the communication interface configured to model communication channels between the first processor and the second processor; and
  - facilitate communication between the first processor and the second processor via the communication interface.

2. The apparatus of claim 1, wherein the one or more processors are further configured to cause the apparatus to:
- generate a second VM, wherein the second processor is emulated via the second VM.

3. The apparatus of claim 1, wherein the first processor is further emulated via an emulation software that comprises a quick emulator (QEMU).

4. The apparatus of claim 1, wherein at least a portion of memory resources of the one or more memories is shared between the first processor and the second processor.

5. The apparatus of claim 4, wherein the portion of memory resources is shared via an inter-emulation shared memory (IESHM) device model.

6. The apparatus of claim 1, wherein the second processor is based on a second model different from the first model.

7. The apparatus of claim 6, wherein each of the first model and the second model comprises one of a microprocessor model or a system-on-a-chip model.

8. The apparatus of claim 1, wherein the second processor is a different architecture of processor relative to the first processor.

9. The apparatus of claim 8, wherein the communication interface is agnostic to a type of processor associated with the first processor and the second processor.

10. The apparatus of claim 1, wherein the communication interface is configured to model communication channels at end-to-end buffers integrated into each of the first processor and the second processor.

11. The apparatus of claim 1, wherein the communication interface is a hard-wired interface between a first memory region of the first processor and a second memory region of the second processor.

12. The apparatus of claim 11, wherein the first memory region is a random-access memory (RAM) region of the first processor, and wherein the second memory region is a RAM region of the second processor.

13. The apparatus of claim 11, wherein the first memory region is a control register of the first processor, and wherein the second memory region is a status register of the second processor.

14. A method for inter-processor interface emulation, comprising:
- generating a first virtual machine (VM);
- emulating, via the first VM, a first processor based on a first model;
- emulating a communication interface between the first processor and a second processor, the communication interface configured to model communication channels between the first processor and the second processor; and
- facilitating communication between the first processor and the second processor via the communication interface.

15. The method of claim 14, further comprising:
- generating a second VM, wherein the second processor is emulated via the second VM.

16. The method of claim 14, wherein the first processor is further emulated via an emulation software that comprises a quick emulator (QEMU).

17. The method of claim 14, further comprising:
- sharing at least a portion of memory resources between the first processor and the second processor.

18. The method of claim 17, wherein the portion of memory resources is shared via an inter-emulation shared memory (IESHM) device model.

19. The method of claim 14,
- wherein the second processor is based on a second model different from the first model.

20. A non-transitory, computer-readable medium comprising computer executable code, the code when executed by one or more processors causes the one or more processors to, individually or in combination to:
- generate a first virtual machine (VM);
- emulate, via the first VM, a first processor based on a first model;
- emulate a communication interface between the first processor and a second processor, the communication interface configured to model communication channels between the first processor and the second processor; and
- facilitate communication between the first processor and the second processor via the communication interface.

* * * * *